United States Patent [19]

Huntington

[11] Patent Number: 4,782,731
[45] Date of Patent: Nov. 8, 1988

[54] BRUSH CUTTING BLADE

[75] Inventor: Kent L. Huntington, Molalla, Oreg.

[73] Assignee: Blount, Inc., Portland, Oreg.

[21] Appl. No.: 83,578

[22] Filed: Aug. 7, 1987

[51] Int. Cl.⁴ .................. B27B 33/08; A01D 34/52
[52] U.S. Cl. ........................................ 83/837; 83/851;
83/852; 83/833; 56/255
[58] Field of Search ................ 83/851, 852, 853, 854,
83/835, 837, 833, 834; 56/233, 235, 255

[56] References Cited

U.S. PATENT DOCUMENTS

| 2,725,906 | 12/1955 | Markham | 83/853 |
| 3,091,266 | 5/1963 | Nelson | 83/852 X |
| 3,866,504 | 2/1975 | Claesson et al. | 83/852 |

FOREIGN PATENT DOCUMENTS

| 204529 | 4/1964 | U.S.S.R. | 83/837 |
| 8194 | of 1894 | United Kingdom | 83/853 |

Primary Examiner—Donald R. Schran
Attorney, Agent, or Firm—Robert L. Harrington

[57] ABSTRACT

A brush cutting blade having a curved slitter type/non-raker type primary cutting tooth and a preceding appendage forming a combination depth gauge and small stem slitter. The primary tooth terminates over the blade body with the cutting edge provided by that curved portion of the tooth between its most lateral point and the point of termination over the blade body. The cutting edge is curved but outwardly directed in a slitter configuration throughout its length. The lateral point of the cutting edge determines the kerf width to prevent binding. The slitter cutting edge of the appendage is hook shaped to cut small willowy-type stems and the appendage has an upper inclined guide edge that guides the larger rigid-type stems into the primary cutting tooth. The uppermost point of this guide edge of the appendage provides a depth gauge for the primary cutting tooth.

10 Claims, 1 Drawing Sheet

U.S. Patent  Nov. 8, 1988  4,782,731
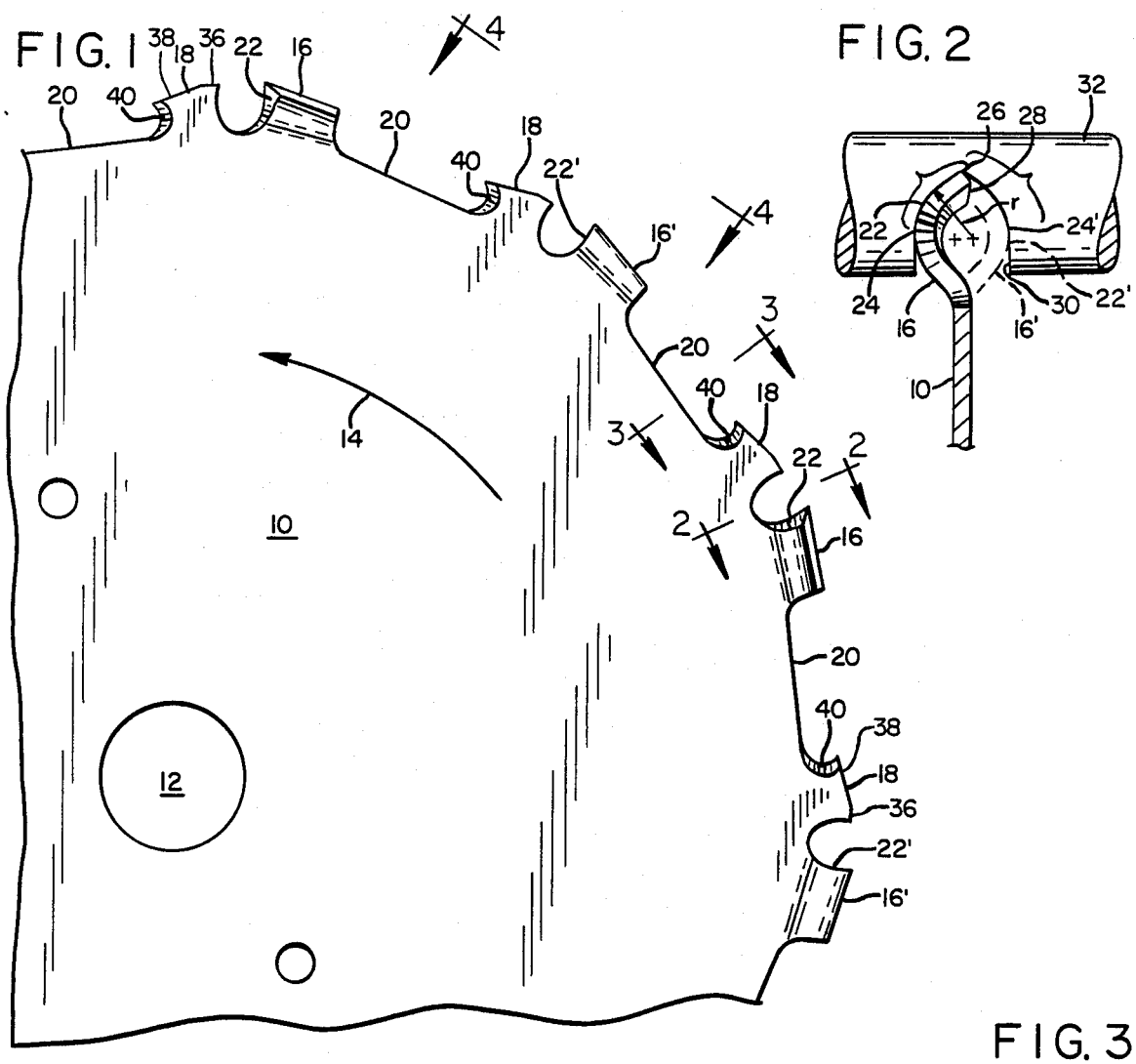
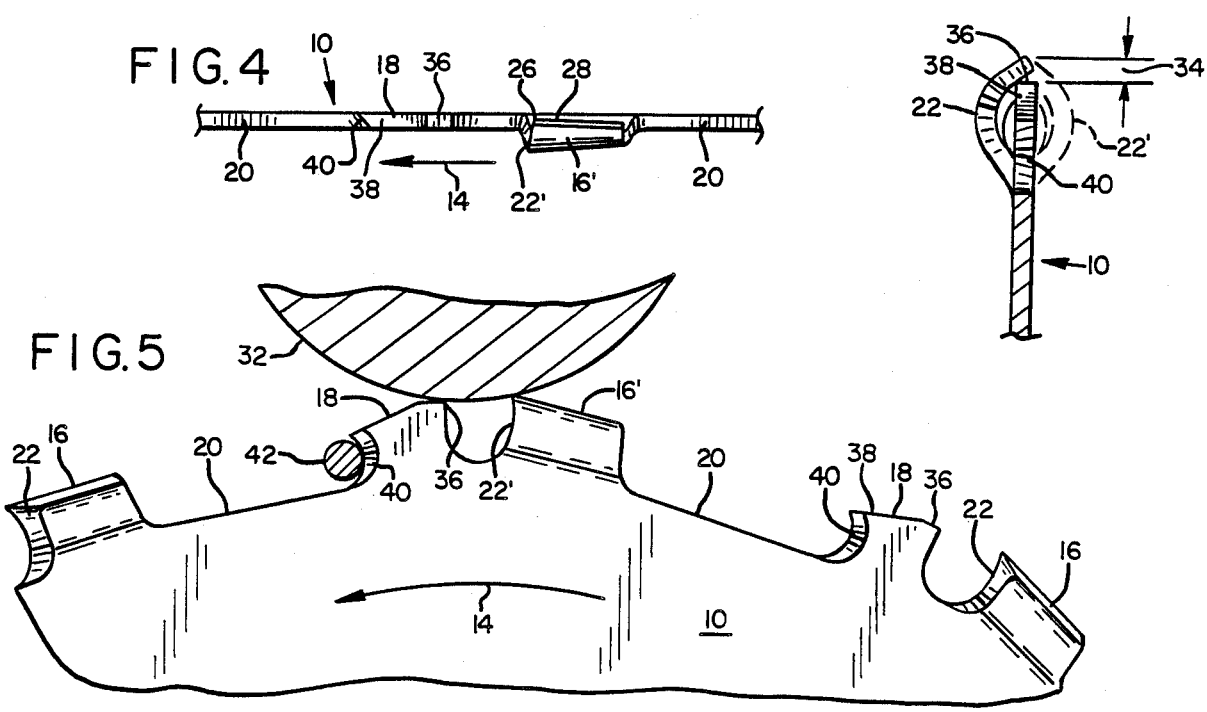

BRUSH CUTTING BLADE

FIELD OF INVENTION

This invention relates to a circular saw blade adapted for cutting brush, and more particularly to a combination of blade features to enable the blade to cut the typical range of brush type materials from small willowy stems like grass to the larger rigid stems like small trees.

BACKGROUND OF THE INVENTION

Brush cutting presents a special problem for a cutting tool. Brush, such as contemplated herein, is comprised of small weedly or willowy stems including grass and similar stems up to ½ inch diameter, as well as the more rigid stems that can include small trees up to five inches in diameter. Cutting tools designed specifically for larger rigid stems are designed to bite into and tear out wood chips. They rely on the rigidity of the material being cut. Such tooth types are not suitable for cutting the weedy or willowly brush materials. These materials simply bounce on the outer projections of the blade because they are devoid of the rigidity to allow the biting or digging in actions.

A number of tooth configurations have been tried without success. A circular saw blade with slitter teeth will pinch-bind when cutting larger stems due to the narrow kerf that is generated. A hooded cutter becomes too aggressive and jams. A slitter tooth is illustrated in U.S. Pat. No. 3,866,504 issued Feb. 18, 1975, to Claesson et al.

BRIEF DESCRIPTION OF THE PRESENT INVENTION

The present invention, in a preferred embodiment, provides a combination of cutting teeth and blade design features that greatly improves on the cutter blades presently adapted for brush cutting. The primary cutting teeth of this improved cutting blade are essentially a variation of the heretofore known slitter tooth. The cutting tooth is curved laterally outwardly of the plane defined by the blade body (alternate teeth being projected from opposite sides of the blade body) and back over the blade body, terminating in a tooth tip at a mid-point over the blade body. The direction of the blade edge curve at the tooth tip is still outwardly directed (radially of the blade body) as opposed to a conventional hooded cover where raker cutting action is generated by the top plate of the tooth. Such raker cutting action is specifically avoided for the present invention.

The portion of the curved slitter tooth as it turns back towards the blade body and continuing substantially to the tooth tip, is the entire cutting edge and generates slitter cutting action only. The cutting tips of successive oppositely curved teeth may overlap a small amount. However, the overlapping portions or tooth tips are only to insure that the center of the kerf is fully cut and removed. The tooth tips are specifically limited so as not to project past the blade body, thereby insuring that the curved intermediate portion of the tooth does the primary cutting, with such intermediate portion specifically designed to determine the kerf width.

The depth of cut of the curved slitter is controlled by a depth gauge appendage that precedes the primary cutting tooth. The depth gauge appendage presents an inclined outer edge that engages and cams larger materials to an appropriate depth of cut.

The appendage itself has a short leading edge that is sharpened into a hook-shaped cutting edge. Preceding the hook-shaped cutting edge is a long shallow gullet. This gullet helps feed the willowy materials into the hook-shaped cutting edge for gripping and cutting thereof.

In operation, the larger rigid material will engage and be cammed by the inclined outer guide edge of the appendage and into the cutting edge of the primary cutting tooth. The small willowy materials will project into and slide along the shallow gullet to be hooked by the leading edge of the appendage and severed thereby.

It will be appreciated that the above preferred embodiment is significantly different from the prior device of U.S. Pat. No. 2,725,906 issued on Dec. 6, 1955, in the name of L. O. Markham. The illustrated tooth of Markham is a curved slitter but the slitting action is primarily accomplished by the overlapping extended tooth tips. This can be readily determined by superimposing FIGS. 3 and 4. Markham also does not provide a combination of cutting teeth in the manner of the present invention.

DETAILED DESCRIPTION AND DRAWINGS

The invention will be more fully appreciated by reference to the following detailed description with reference to the accompanying drawings wherein:

FIG. 1 is a side view of a cutting blade in accordance with the invention;

FIG. 2 is a section view taken on view line 2—2 of FIG. 1;

FIG. 3 is a section view taken on view line 3—3 of FIG. 1;

FIG. 4 is a view taken on view line 4—4 of FIG. 1; and

FIG. 5 is a enlarged partial view illustrating the blade of FIG. 1 being operated to cut brush.

FIG. 1 illustrates a circular saw blade 10. The blade 10 is adapted to be mounted on a brush cutting tool, with the tool arbor projected through the mounting hole 12. The blade is rotated by the tool as indicated by arrow 14. The periphery of the blade is characterized by three features. A primary cutting tooth 16 is preceded by an appendage 18 that is both a depth gauge for the primary tooth and a small stem cutter. Preceding the appendage 18 is an elongated shallow gullet defined by guide edge 20. The sequence of primary cutting teeth, appendage, and leading gullet is repeated about the periphery of the blade body with alternate cutting teeth being right and left hand cutters, respectively.

Referring now to FIGS. 2 and 4, illustrated in front and top views respectively, is a primary cutting tooth 16. Superimposed in dash lines in FIG. 2 is the configuration of a preceding or succeeding primary cutting tooth 16' which is bowed or curved in the opposite direction.

It is to be particularly noted that the radius r of the curved cutting edge 22 forms a slitting or slicing cutting action and stops short of the apex of the curve at which point the blade would become a raker cutting tooth. In the embodiment illustrated, the pivot point for the radius r is established on the plane defined by the opposite side wall of the blade body (opposite to the side of curvature of the tooth).

The cutting tooth 16 is sharpened to provide a leading cutting edge 22. The "working" portion of cutting edge 22 is that portion that extends upwardly from its most laterally offset point 24 around to a point 26 adjacent the tip 28. For purposes of this invention, tip 28 is considered the termination of this working cutting edge and including that portion of the cutting tooth which overlaps succeeding and preceding oppositely curved cutting teeth 16'. This overlapping tooth tip portion insures a full width cutting of the combined cutting edges 16, 16' but is retained for that purpose only. It is allowed only to extend the width of the blade body and avoids cutting the kerf area preceding the intermediate curved portion of the cutting tooth; i.e. from point 22, 22' to the plane of the plane body.

FIG. 2 illustrates the formation of a kerf 30 through a large rigid stem 32. As will be noted, the inner kerf wall is formed by the combined cutting edges 22 and 22', from point 24 of tooth 16 around to point 28 and back to point 24' of tooth 16'.

FIGS. 3 and 4 illustrate the appendage 18 (referred to sometimes herein as the secondary or small stem cutting tooth). As indicated the appendage 18 has multiple functions. First it is a depth gauge as determined by its most outwardly projected point 36, at the rear most position of the appendage 18. That is, it provides a barrier that prevents the cutting edge 22 from taking too deep a bite. The cutting edge 22 (and 22' in dash lines) illustrate that the difference 34 is the deepest bite that is permitted by the cutting edge.

The second function of the appendage is to provide an angled upper guide edge 38. Appendage guide edge 38 begins at a point above gullet guide edge 20 by an amount that accommodates the diameter of small willowy stems. Larger stems will simply be engaged and cammed by guide edge 38 to the desired depth of cut at point 36. In this respect the appendage is a bumper element or safety element as often referred to in the industry.

The third function of the appendage 18 is to provide a cutting edge 40 along the transitional edge between the appendage's guide edge 38 and the gullet's guide edge 20. As illustrated in FIG. 1, cutting edge 40 is concavely curved, more commonly referred to as hook shape.

The gullet guide edge 20 defines an elongated reach between the rear end of a preceding cutting tooth 16 and the cutting edge 40 of a succeeding appendage 18. This elongated shallow gullet is about the same length as the combined appendage 18, cutting tooth 16, and spacing therebetween. Thus, about 50% of the exposed periphery of the blade is occupied by these gullets. The long reach of the gullet enables the willowy stems to become projected into the gullet between the cutters and appendage for cutting by the hook-shaped cutting edge.

SPECIFIC DIMENSIONS

In a specific embodiment, a blade nine inches in diameter of about 0.070 inch thick steel plate was provided with 12 primary cutting teeth (16, 16') each having a length of about ⅝ to ¾ inches. The teeth were preceded by appendages 18 having a length of about 7/16 inch. The appendages were spaced forwardly of the primary cutting teeth in each case by about 5/16 inch. The total length of the tooth, appendage and spacing therebetween was about 1¼ inches. The spacing defined by guide edge 20 forming the shallow gullet was about 1 1/16 inches. (It should here be noted that the spacing between the cutting tooth and preceding depth gauge is also commonly referred to as a gullet. The term is not used for this description to avoid confusion as between the two gullet spacings, the term "gullet" being herein reserved for the elongated spacing between the appendage 18 and the preceding primary tooth 16.)

The height of the tooth at the cutting edge when new was about 5/16 inch and the height of the appendage adjacent the cutting tooth when new was about ¼ inch. The depth gauge setting was thus about 1/16 inch. The height of the appendage at the shallow end was about 3/16 inch. The height differential as between the beginning and end of the incline was about 3/32, the additional 1/32 inch being the result of a difference in the depth of the gullet and the depth of the spacing between the tooth and appendage. The curvature of the cutting edges 22 and 22' were established as having a radius or ¼ to 5/16 inch; i.e. radius r in FIG. 2.

OPERATION

The operation of the saw blade of the invention is illustrated in FIG. 5. The rigid stem 32 is shown in position to be cut by the primary cutting edge 22. As will be noted, the upper rear point 36 of the appendage 18 establishes the depth of cut permitted by cutting edge 22.

The cutting edges 22 and 22', in combination, (see FIG. 2) form a parabolically curved cutting edge that carves out a substantially parabolically curved kerf through the stem 32. As will be noted, the working portion of the cutting edge 22 is that portion between the outer lateral point 24 and point 26.

The cutting tooth 16, its cutting edge 22, the depth gauge height 36 and the inclined guide edge 38 are all designed to cut rigid stems. The cutting edge 40 is established with a height and hook-shaped cutting edge configuration especially designed to accommodate the small willowy stems 42. As illustrated in FIG. 5 the stems 42 fall into the shallow gullet spacing and onto guide edge 20 which guides the stem into the hook-shaped cutting edge 40. The hook shape of cutting edge 40 and its vertical cutting edge draws the stem into and through the cutting edge to be sliced and severed by edge 40.

It is believed that the curved slitting/non-raking action of the primary tooth is important to the smooth cutting of the blade through the large rigid stem materials of brush. The intermediate curved portion effectively carves out a kerf width and avoids binding of the blade. As the kerf tends to close on the blade, the laterally positioned curved cutting edge cuts the side walls to maintain the desired clearance. The slicing action of the blade edge will not, as in a raker tooth, dig in and pull the blade into an overbiting action which also produces binding.

It will be appreciated that the invention may be utilized in a number of different combinations and is not limited to the specific embodiment described above. Whereas the hook-shaped cutting edge, elongated gullet and configured cutting edges of the primary cutter, are believed novel in combination, they also independently provide benefits in combination with features of conventional cutting blade configurations. Accordingly, the invention encompasses all of the modifications and variations of the definitions of the appended claims.

What is claimed is:

1. A brush cutting blade comprising;

a circular saw blade body establishing a body plane defining a radial direction and have a periphery defined by a repeating sequence of a primary cutting tooth having a leading cutting edge, and an appendage forming a depth gauge peak preceding and spaced from the cutting edge of the primary cutting tooth, said leading cutting edge establishing the radially outermost cutting point of said saw blade body, one of said primary cutting teeth extended laterally outwardly and then back over the body plane to form a curved portion terminating at the body plane, and another of said primary cutting teeth extended laterally outwardly from the opposite side of the body plane and then back over the body plane to form a curved portion terminating at the body plane, the leading edge of said curved portions being shaped into cutting edges and each defining an outwardly directed cutting edge from the outermost lateral point to a point over the blade body for slitter type cutting action, said point over said blade body providing said radially outermost cutting point and said slitter type cutting action forming a substantially parabolically curved kerf that is wider than the blade body to reduce binding and pinching.

2. A brush cutting blade as defined in claim 1 wherein said appendage has a leading edge of designated height and a rearwardly positioned peak defining the depth gauge peak, and an upper guide surface therebetween that is inclined radially outwardly and progressing from front to back to cam rigid brush materials to a desired depth of cut for cutting by a primary cutting tooth.

3. A brush cutting blade as defined in claim 1 wherein the leading edge of the appendage is formed into a vertically oriented cutting edge, and a gullet spacing preceding said appendage cutting edge for receiving small stem brush materials to be severed by said appendage cutting edge.

4. A brush cutting blade as defined in claim 3 wherein said appendage cutting edge is hook shaped.

5. A brush cutting blade as defined in claim 4 wherein said gullet spacing is substantially the combined length of the appendage, cutting tooth and spacing therebetween.

6. A brush cutting blade comprising;
a circular saw blade body establishing a body plane and having a periphery defined by a repeating sequence of a primary cutting tooth having a leading cutting edge and an appendage forming a depth gauge peak preceding and spaced from the cutting edge of the primary cutting tooth,
said appendage having a hook shaped leading cutting edge of designated height for severing small stem brush materials.

7. A brush cutting blade as defined in claim 6 including an elongate shallow gullet formed on the saw blade periphery forward of the appendage for permitting small stem brush materials to engage and be severed by said leading cutting edge.

8. A brush cutting blade as defined in claim 7 wherein said appendage has a rear positioned peak that is the depth gauge peak and an upper guide surface between the leading cutting edge and the peak that is inclined outwardly front to back to cam rigid brush materials to the desired depth of cut for cutting by the primary cutting tooth.

9. A brush cutting blade as defined in claim 7 wherein the length of the gullet is substantially the combined length of the appendage, cutting tooth and spacing therebetween.

10. A brush cutting blade as defined in claim 6 wherein the cutting edge of the primary cutting tooth is extended laterally outwardly and then back over the body plane to form a curved portion terminating at the body plane, the leading edge of said curved portion being shaped into a cutting edge and defining an outwardly directed cutting edge from the outermost lateral point to a point over the blade body for slitter type cutting action, said slitter type cutting action forming a kerf that is wider than the blade body to reduce binding and pinching.

* * * * *